(12) United States Patent
Altahan et al.

(10) Patent No.: US 7,640,405 B2
(45) Date of Patent: *Dec. 29, 2009

(54) METHOD AND APPARATUS FOR FREEING MEMORY

(75) Inventors: Moti Altahan, Tel Aviv (IL); Sharon Levy, Hadera (IL)

(73) Assignee: Marvell World Trade Ltd., St. Michael (BB)

( * ) Notice: Subject to any disclaimer, the term of this patent is extended or adjusted under 35 U.S.C. 154(b) by 356 days.

This patent is subject to a terminal disclaimer.

(21) Appl. No.: 11/779,198

(22) Filed: Jul. 17, 2007

(65) Prior Publication Data

US 2008/0010430 A1    Jan. 10, 2008

Related U.S. Application Data

(63) Continuation of application No. 11/497,331, filed on Aug. 2, 2006, now Pat. No. 7,415,583, which is a continuation of application No. 10/327,957, filed on Dec. 26, 2002, now Pat. No. 7,103,729.

(51) Int. Cl.
G06F 12/00 (2006.01)
(52) U.S. Cl. ...................................... 711/154; 711/170
(58) Field of Classification Search .................... None
See application file for complete search history.

(56) References Cited

U.S. PATENT DOCUMENTS

| | | | | |
|---|---|---|---|---|
| 5,481,694 A * | 1/1996 | Chao et al. | .................... | 711/112 |
| 6,016,529 A * | 1/2000 | Woodman | ........................ | 711/3 |
| 6,032,160 A * | 2/2000 | Lehman | ......................... | 707/205 |
| 6,131,151 A * | 10/2000 | Graef | .......................... | 711/173 |
| 6,185,663 B1 * | 2/2001 | Burke | .......................... | 711/156 |
| 6,711,170 B1 * | 3/2004 | Brown | ....................... | 370/395.7 |
| 6,711,595 B1 * | 3/2004 | Anantharao | ................... | 707/206 |
| 6,742,084 B1 * | 5/2004 | Defouw et al. | ............... | 711/133 |
| 6,968,351 B2 * | 11/2005 | Butterworth | ................. | 707/206 |
| 7,130,857 B2 * | 10/2006 | Rabaioli | ...................... | 707/101 |
| 2003/0161280 A1 | 8/2003 | Gruhn et al. | | |
| 2003/0166399 A1 * | 9/2003 | Tokkonen et al. | ............ | 455/419 |
| 2004/0059878 A1 | 3/2004 | Madany | | |

FOREIGN PATENT DOCUMENTS

| | | |
|---|---|---|
| EP | 1168702 | 1/2002 |
| WO | 01/78036 | 10/2001 |
| WO | 01/93487 | 12/2001 |

OTHER PUBLICATIONS

PCT Search Report for International Application No. PCT/US03/39105, Jun. 4, 2004.

"Performance Comparison of Hybrid-ARQ Schemes", TSG-RAN WG1#17, Stockholm, Sweden, Oct. 20-24, 2000, Agenda Item: Adhoc#24, HSDPA, Source: Motorola, pp. 1-7.

(Continued)

*Primary Examiner*—Jack A Lane

(57) ABSTRACT

A method of apparatus to free at least a portion of memory space of a memory device from at least a portion of a stored data block, wherein the freeing is based on the block sequence number of the stored data block and/or a quality indicator value related to at least a portion of the stored data block. Other embodiments may be described and claimed.

8 Claims, 2 Drawing Sheets

OTHER PUBLICATIONS

Balachandran et al., "A Proposal for EGPRS Radio Link Control Using Link Adaption and Incremental Redundancy", Lucent Technologies, 1999, Bell Labs Technical Journal Jul.-Sep. 1999, oo 19-36.
TSG-RAN Working Group 1 TSGR1#17(00) 1382, Sweden, Nov. 21-24, 2000 Agenda Item AH24, HSDPA, Source: Lucent Technologies Title: Asynchronous and Adaptive Incremental Redundancy (A2IR) Proposal for HSDPA, Document for: Discussion and decision, pp. 1-5.

* cited by examiner

METHOD AND APPARATUS FOR FREEING MEMORY

CROSS-REFERENCES TO RELATED APPLICATIONS

This present application is a continuation of U.S. patent application Ser. No. 11/497,331 filed Aug. 2, 2006, now U.S. Pat. No. 7,415,583, titled Method and Apparatus for Freeing Memory, which is a continuation of U.S. Pat. application Ser. No. 10/327,957 filed Dec. 26, 2002, now U.S. Pat. No. 7,103,729 issued Sep. 5, 2006 titled Method and Apparatus of Memory Management. The specification of said application and patent are hereby incorporated in their entirety, except for those sections, if any, that are inconsistent with this specification.

TECHNICAL FIELD

Embodiments of the present invention relate to the field of memory management and, in particular, to techniques for freeing at least a portion of memory space of a memory device.

BACKGROUND

A backward error correction schemes such as Automatic Repeat Request (ARQ) and forward error correction (FEC) may be used in packed data communication systems. Some cellular communication systems and wireless local area network (WLAN) may use the above error correction schemes to transfer packed data over air links. A data packet used in the packed data communication system may be referred as a data block. The ARQ mechanism sends\receives Acknowledged (ACK)\Not Acknowledged (NACK) indications of data block decoding success in the receiver.

ARQ scheme may include retransmissions of data for transmission that have been received with corrupted data. Some ARQ schemes for example, Hybrid-ARQ (also known in the art as H-ARQ type m with one redundancy version) may involve retransmissions of a data block and combining copies of the data block at a receiver memory.

Another form of hybrid ARQ scheme, which may be known in the art as incremental redundancy (IR) or as H-ARQ type II or type III, may transmit additional information of negatively acknowledged data blocks. In the ARQ scheme, a decoder in the receiver may store at the receiver memory information from received transmissions of the data block The decoder may combine and decode available information related to the data block.

Accordingly, in the case that the quality of the air link is poor, the amount of retransmissions may be increased, and the receiver memory may not be able to store at least some of the received data blocks. Thus, error correction and/or decoding of the packed data may fail.

Thus, there is a continuing need for better ways to mitigate the above-described disadvantages.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
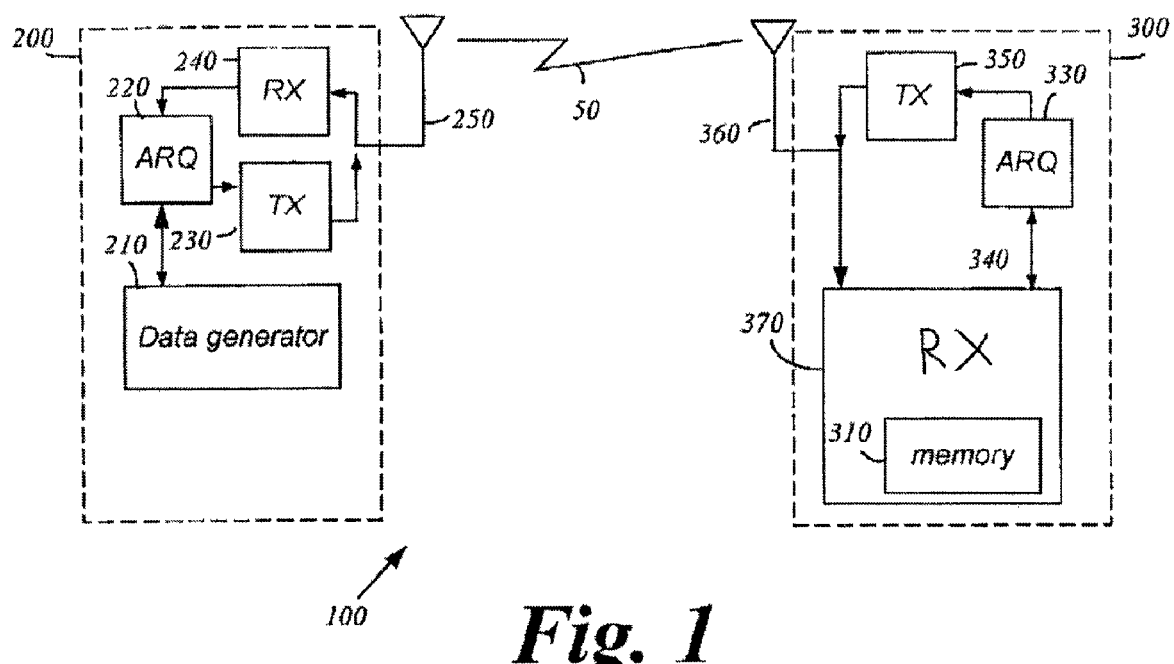
FIG. 1 is a block diagram of a communication system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follows, are presented in terms of algorithms and symbolic representations of operations on data bits or binary digital signals within a receiver memory These algorithmic descriptions and representations may be the techniques used by those skilled in the memory management arts to convey the substance of their work to others skilled in the art.

Unless specifically stated otherwise, as apparent from the following discussions, it is appreciated that throughout the specification discussions utilizing terms such as "processing," "computing," "calculating," "determining," or the like, refer to the action and/or processes of a receiver or receiving system that manipulate and/or transform data represented as physical, such as electronic, quantities within the receiving system's registers and/or memories into other data similarly represented as physical quantities within the receiving system's memories, registers or other such information storage, transmission or display devices.

It should be understood that the present invention may be used in variety of applications. Although the present invention is not limited in this respect, the circuits and techniques disclosed herein may be used in many apparatuses such as data transceivers. Data transceivers intended to be included within the scope of the present invention include, by a way of example only, cellular radiotelephone transceivers, two-way radio transceivers, digital system transceivers, wireless local area network transceivers, and the like.

Type of cellular radiotelephone transceivers intended to be within the scope of the present invention include, although not limited to, General Packet Radio Service (GPRS), enhance general packet radio service (EGPRS), and the like.

Turning firstly to FIG. 1, a block diagram of a wireless communication system 100 according to an exemplary embodiment of the invention is shown. Although the scope of the present invention is not limited in this respect, wireless communication system 100 may include a base station 200, a mobile station 300, and an air link 50, if desired. Accordingly, in one embodiment of the invention, wireless communication system 100 may include a WLAN communication system, thus, base station 200 may be an access point (AP) of WLAN and mobile station 300 may be a mobile unit (MU) of the WLAN communication system. Further, in other embodiment of the invention, the wireless communication system may be a two-way communication system, wherein base station 200 and mobile station 300 may include substantially the same architecture, if desired.

Although the scope of the present invention is not limited in this respect and for the simplicity of the description, an embodiment of wireless communication system 100 will be described in the context of a cellular communicating system such as, for example, a Global System for Mobile Communication (GSM), Enhanced Data for GSM Evolution (EDGE) and the like. Although the scope of the present invention is not limited in this respect, base station 200 may include a data generator 210, an error correction scheme such as, for example, ARQ 220, a transmitter. (TX) 230, a receiver (RX) 240, and an antenna 250, for example, a dipole antenna and the like.

Although the scope of the present invention is not limited in this respect, mobile station 300 may include an antenna 360, for example, a dipole antenna or the like, an error correction scheme such as, for example, ARQ 330, a transmitter (TX) 340, and a receiver 370 that may include a memory 310.

In operation, although the scope of the present invention is not limited in this respect, base station 200 may transmit data blocks over air link 50 to mobile station 300. Accordingly, transmission of data blocks with this embodiment of the present invention may be preformed, for example by generating data blocks with data block generator 210. Transmitter 230 and antenna 250 may transmit in accordance with a predefined error correction scheme, for example, ARQ 220 may transmit the modulated radio frequency (RF) signal of the data. Furthermore, ARQ scheme 220 may provide to a transmitted data block a sequence number based on the order of generation of data blocks, if desired.

Although the scope of the present invention is not limited in this respect, the data blocks may be received by antenna 360 and receiver 370 of mobile station 300. Receiver 370 may decode the data blocks and may verify the decoded data block information with an error detection scheme, such as, for example, Cyclic Redundancy Check (CRC). ARQ 330 may transmit a response to the received blocks, via transmitter 340 and antenna 360, to be received by base station 200. In some ARQ schemes, the response to errors in the received data block may be "not-acknowledged" (NAK) and a confirmation of receiving a data block without errors may be "acknowledged" (ACK).

Although the scope of the present invention is not limited in this respect, base station 200 may receive ACK and NAK responses from mobile station 300. In embodiments of the invention wherein ARQ scheme 220 may be a H-ARQ type III scheme with one redundancy, for example, the response for NAK may be a retransmission of the corrupted data block. Alternatively, in some embodiments of the invention, ARQ scheme 220 may include IR ARQ scheme (e.g., H-ARQ type II\III scheme). In such embodiments, the response for NAK may be repeated transmission of portions of the corrupted data block that may include new redundant information until ARQ scheme 220 may receive ACK for the data block, although the scope of the present invention is in no way limited in this respect.

Although the scope of the present invention is not limited in this respect, retransmitted data blocks and/or portions of data blocks and/or new redundant information of the corrupted block may be received by receiver 370 of mobile station 300. In addition, receiver 370 may mange memory 310. Although the scope of the present invention is not limited in this respect, the function of receiver 370 may be implemented by a computer, for example, a computer including a digital signal processor (DSP), a special design processor, a baseband computer, and the like.

Although the scope of the present invention is not limited in this respect, receiver 370 may store the received data blocks or portion of received data blocks in memory 310 and/or free some data blocks from memory 310 and/or combine a received data blocks with stored data blocks, if desired.

Although the scope of the present invention is not limited in this respect, memory 310 may be a random access memory (RAM), a static RAM (SRAM), a dynamic RAM (DRAM), a synchronous DRAM (SDRAM), a Flash memory, an electrically erasable programmable read-only memory (EEPROM) and the like. Freeing a data block and/or data blocks from memory may be performed by designating the memory location of the data block as 'free for writing', although the scope of the present invention is no way limited in this respect. Furthermore, freeing a data block and/or data blocks may be performed by deleting the data block(s) or by other methods known in the art, if desired.

Figure 2:
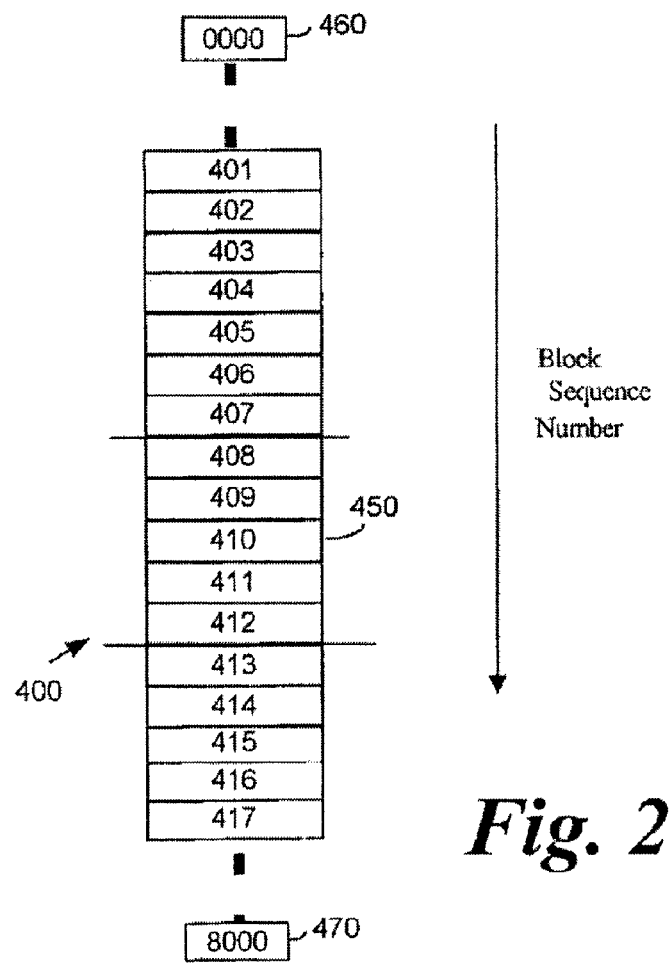
FIG. 2 is a schematic illustration of an arrangement of received data blocks stored in a memory according to an exemplary embodiment of the present invention.

Turning to FIG. 2, an example of an arrangement of data blocks in memory 310 according to an exemplary embodiment of the present invention is shown. Although the scope of the present invention is not limited in this respect, memory 310 may include data blocks 400, wherein a data block may be identified by a sequence number. In this example, data blocks 400 may includes sequence numbers from 401 to 417, if desired.

Although the scope of the present invention is not limited in this respect, data blocks 400 may be stored in memory 310 based on their sequence numbers wherein, in this example, the lower sequence number is 401 an the highest sequence number is 417. Furthermore, data blocks 400 may be arranged, physically or symbolically, in subsets of data blocks. For example, a subset 450 may include data blocks with sequence numbers from 408 to 412, if desired.

Although the scope of the present invention is not limited in this respect, in one embodiment of the invention, determination of a size of subset 450 of data blocks may be based on a fraction of the memory size. For example, for a memory size of 20 data blocks, a fraction of the memory size may be ¼ and a subset of data blocks may include 5 data blocks, e.g., block sequence numbers 408, 409, 410, 411, 412, if desired. Alternatively or additionally, determination of a size of subset 450 of data blocks may be based on the memory size allocated for storing information of unsuccessfully decoded data blocks.

Additionally or alternatively, the determination of the size of subset 450 may be performed dynamically and may be based on the block sequence numbers of the data blocks currently stored in memory 310. For example, the size of subset 450 may be determined by calculating the difference between the highest block sequence number and the lowest block sequence number. For example, the highest data block sequence number may be 417 and the lowest data block sequence number may be 401. Thus, in this example, the calculated distance between the data blocks is 17 (e.g., 417–401+1). In this example, a fraction of the distance may be any integer between 1 to 17, for example, 3, whereby subset 450 may include three blocks with corresponding block sequence numbers, for example, 415, 416, 417.

Additionally or alternatively, in some embodiments of the invention, the calculation of the size of subset 450 may be based on a predetermined number of data blocks and/or a function of the number of received blocks currently in memory. For example, in some embodiments of the present invention, the predetermined number of data block in the subset may be 4, or ⅓ of the number of currently stored data blocks, although the scope of the present invention is not limited in this respect.

Figure 3:
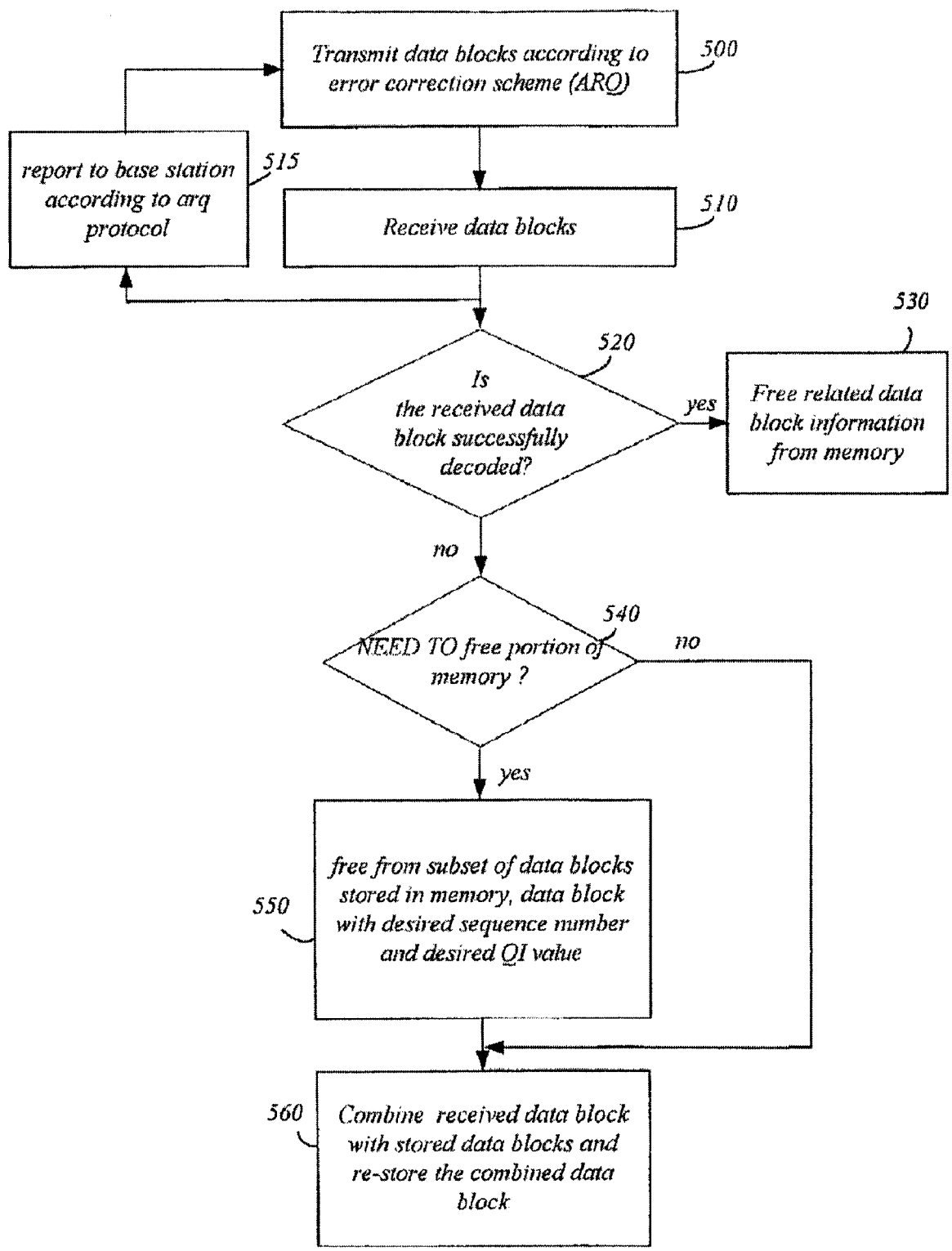
FIG. 3 is a flowchart of method of memory management according to an exemplary embodiment of the present invention.

Turning to FIG. 3, a flowchart of method of memory management according to an exemplary embodiment of the present invention is shown. Although the scope of the present invention is not limited in this respect, the method may begin with transmission of data blocks according to an error correction scheme such as, for example, ARQ (block 500). Mobile station 300 may receive the data blocks (block 510) and receiver 370 may decode the data blocks and may report the successful or unsuccessful decoding of the blocks to base station 200, using an ARQ scheme (block 515). For example, when a received data block is not decoded successfully, a NACK message may be sent to base station 200, requesting retransmission of the data block. Conversely, when a received data block is successfully decoded, ACK message may be sent to base station 200.

Although the scope of the present invention is not limited in this respect, receiver 370 may check if the received data block was successfully decoded (diamond 520). On success, receiver 370 may free information related to the successfully decoded data block from memory 310 (block 530). For unsuccessfully decoded data blocks, receiver 370 may examine if there is a need to free a portion of memory 310 (diamond 540). If freeing of a portion of memory 310 may be required, then receiver 370 may decide which portion of memory 310 may be freed base on characteristic parameters of data blocks 400. For example, one characteristic may be the data block sequence number. Another characteristic may be a value of quality indicators (QI) related to the data block and/or to a portion of the data block.

Although the scope of the present invention is not limited in this respect, receiver 370 may free from subset 450 at least a portion of data block 400 based on a desired sequence number and/or a desired QI value (block 550). In one embodiment of the present invention, receiver 370 may free at least a portion of the data block with the highest sequence number amongst other data block of subset 450 and/or may free the data block with the worst QI value amongst other data blocks of subset 450.

Alternatively or additionally, receiver 370 may search the subset 450 that includes data blocks with the highest sequence numbers, e.g., from the set of data blocks currently stored in memory 310 and/or from data blocks received by receiver 370 and not stored in memory 310. In search of a subset, receiver 370 may search for the data block with the worst estimated QI that may indicate a low quality of the data in the data block, and free at least a portion of memory 310 being used by this data block. For example, receiver 370 may estimate and/or calculate a QI value for data blocks of subset 450 and may delete a data block based on the quality indicator value, for example, signal to interference and noise ratio (SINR), if desired.

Although the scope of the present invention is not limited in this respect, in other embodiments of the present invention, receiver 370 may free a portion of memory 310 from a previously received data block with no reference to its sequence number. More specifically, receiver 370 may search data blocks 400 and free a portion of memory 310 from the data block with the lowest QI value (e.g. minimum estimated SINR value). Additionally or alternatively, in other embodiments of the invention such as, for example, in communication systems that use EGPRS methods for data block transportation, receiver 320 may free memory 310 from the data block that has the highest absolute sequence number. The highest absolute sequence number may refer to sequence number that generated in a cyclic way, for example, if the last sequence number of data block is 2047 then the next sequence number may be 1. Thus, 1 is the highest absolute sequence number (1>2047), although the scope of the present invention is not limited in this respect.

Although the scope of the present invention is not limited in this respect, the stored data blocks may include portions of previously received data block and/or redundant data related to the same or similar block sequence numbers, that are stored in memory 310. Receiver 320 may combine the received data with the stored data block and restore the combined data block in memory 310, if desired (block 560). It should be known to one skilled in the art that data blocks may be referred as data blocks and/or bursts, if desired.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
   means for freeing at least a portion of a data block stored in a memory, wherein the freeing is based on at least one of a block sequence number of the data block or a quality indicator value related to at least a portion of the data block and;
   further comprising means for locating, amongst a subset of data blocks stored in the memory, a data block with a desired characteristic, and wherein at least a portion of the data block with the desired characteristic is freed from memory.

2. The apparatus of claim 1, wherein the desired characteristic is an absolute highest sequence number and the at least a portion of the data block with the absolute highest sequence number is freed from the memory.

3. The apparatus of claim 1, further comprising means for estimating the quality indicator value of the data block portion of the subset, and wherein the at least a portion of the data block is freed based on the quality indicator value.

4. The apparatus of claim 1, further comprising means for determining a size of the subset of data blocks based on a fraction of the memory size.

5. The apparatus of claim 1, further comprising means for dynamically determining the size of the subset of data blocks based on the block sequence numbers of data blocks currently stored in the memory.

6. The apparatus of claim 1, further comprising means for determining the size of the subset of data blocks based on the number of data blocks currently stored in the memory.

7. The apparatus of claim 1, further comprising:
   means for receiving a re-transmitted data block and combining a portion of the re-transmitted data block with a stored data block to provide a combined data block, and
   means for storing the combined data block in the memory.

8. The apparatus of claim 1, wherein the freeing is based on at least the block sequence number and the quality indicator value.

* * * * *